United States Patent [19]

Chen et al.

[11] Patent Number: 4,521,925
[45] Date of Patent: Jun. 11, 1985

[54] NONRECIRCULATING VACUUM FLUSH TOILET SYSTEM UTILIZING FRESH WATER

[75] Inventors: Tyen C. Chen, Bellevue; Forrest B. Busching, Tacoma; William D. Hale, Everett; Bjorn R. Kristoffersen, Kirkland, all of Wash.

[73] Assignee: The Boeing Company, Seattle, Wash.

[21] Appl. No.: 393,828

[22] Filed: Jun. 30, 1982

[51] Int. Cl.$^3$ .............................................. E03D 3/10
[52] U.S. Cl. .......................................... 4/362; 4/321; 4/342; 4/323
[58] Field of Search ................... 4/321, 317, 318, 332, 4/342, 415, 422, 425, 361, 420, 354, 323, 322, 4/320

[56] References Cited

U.S. PATENT DOCUMENTS

| | | | |
|---|---|---|---|
| 2,028,468 | 1/1936 | Murphy | 4/300 |
| 3,504,381 | 4/1970 | Dewey | 4/321 |
| 3,545,011 | 12/1970 | Helke et al. | 4/317 |
| 3,591,868 | 7/1971 | Owens | 4/300 |
| 3,648,297 | 3/1972 | MacMillan | 4/420 |
| 3,788,338 | 1/1974 | Burns | 4/661 X |
| 3,829,905 | 8/1974 | Broek | 4/329 X |
| 3,853,138 | 12/1974 | Amren | 4/661 X |
| 3,890,651 | 6/1975 | Wood | 4/326 |
| 3,965,492 | 6/1976 | Hendricks | 4/422 |
| 3,995,328 | 12/1976 | Carolan et al. | 4/316 |
| 3,996,628 | 12/1976 | Mollerstedt | 4/361 |
| 4,041,554 | 8/1977 | Gregory et al. | 4/420 |
| 4,063,315 | 12/1977 | Carolan et al. | 4/316 |
| 4,242,765 | 1/1981 | Russell | 4/321 |
| 4,275,470 | 6/1981 | Badger et al. | 4/316 |
| 4,332,041 | 6/1982 | Kristoffersen | 4/321 |
| 4,376,315 | 3/1983 | Badger et al. | 4/316 |

Primary Examiner—Henry K. Artis
Attorney, Agent, or Firm—Christensen, O'Connor, Johnson & Kindness

[57] ABSTRACT

A lavatory system suitable for use on a commercial passenger aircraft includes at least one toilet bowl for receiving waste and a waste-holding tank in fluid communication with said toilet bowl for receiving waste from said toilet bowl. The waste-holding tank is kept at a pressure less than the ambient pressure surrounding the toilet bowl so that waste from the toilet bowl is drawn to the tank by the difference in pressure. A flush valve is provided in the drain line between the toilet bowl and the waste-holding tank and is selectively operable to pass the toilet bowl contents into the waste-holding tank. Water from the potable water supply system is provided to the toilet bowl to wash the sides of the toilet bowl and to assist in moving the waste material to the drain line. A water inlet valve is provided to selectively control the introduction of water into the toilet bowl and preferably the water inlet valve and flush valve are operated in a timed sequence by actuation of a single flushing switch. The water is introduced into the toilet bowl through a nozzle ring which directs the flow of the water onto the interior of the toilet bowl in coherent streams and is matched to the toilet bowl configuration in such a manner that a minimal amount of water is utilized per flush. The range of water utilized is in the neighborhood of six to ten ounces per flush and the water is directed onto the sides of the bowl in a plurality of streams such that each directed stream is dedicated to rinse a particular area of the toilet bowl with the streams of water coalescing to form a substantially continuous sheet of water on substantially all parts of the interior surface of the toilet bowl to completely flush the toilet bowl of waste material.

14 Claims, 9 Drawing Figures

NONRECIRCULATING VACUUM FLUSH TOILET SYSTEM UTILIZING FRESH WATER

BACKGROUND OF THE INVENTION

This invention relates to toilet systems that utilize a pressure differential to flush waste material from the toilet bowl to a waste-holding tank and in particular relates to such toilet systems in which the flushing liquid is not recirculated and which utilize fresh water for each flush to rinse the toilet bowl and assist in the evacuation of the waste matter from the bowl.

The use of differential pressure in municipal and domestic waste disposal systems is not of recent origin. The 1895 edition of *Chambers' Encyclopedia* describes a system in which the suction caused by pressure differential was used in place of water to remove waste material from a toilet bowl and move it to a waste holding or disposal tank. A vacuum flush system is especially desirable in situations where the use of water and gravity to flush waste from the bowl are restricted by the limited availability of large quantities of water for use in the flushing operation. Examples of situations in which water supplies are limited are in commercial passenger aircraft and other commercial conveyances, such as trains and boats, and also in vacation and resort dwellings that are located in remote areas with no municipal water system.

A vacuum flush toilet system for use in commercial aircraft is described in U.S. Pat. No. 3,995,328, issued Dec. 7, 1976 to Carolan et al. and assigned to the Assignee of the present invention, which is incorporated herein by reference. Previously, most toilet systems used in commercial aircraft have been of the recirculating type wherein the flushing liquid and waste material removed from the toilet bowl pass through a filtering system and the flushing liquid is recycled for use in later flushing of the toilet bowl. While recirculating flushing systems serve the purpose, it is desirable to make the toilet systems of commercial passenger aircraft as nearly as possible like those used by individuals in the home, so that the passenger will be more accustomed to the use of the system and feel more at ease. Also, recirculating toilets require a large-capacity filtration system in order to separate the flushing liquid from solid waste, thereby permitting the reuse of the flushing liquid. Such filtration systems require frequent maintenance and also present problems in odor control and sanitation.

The major drawback to the use of freshwater flushing in a commercial aircraft toilet system is the limited amount of water that can be dedicated to the flushing of toilet bowls. The most logical source of flushing liquid for the commercial aircraft is in the potable water supply, since each aircraft is generally equipped with such a potable water supply for each lavatory, however, use of the potable water supply for toilet flushing imposes a strict requirement that each flush use a minimum amount of water in order to conserve storage volume and minimize water weight in the aircraft. Also, to avoid complications in pressure regulation and valving, it is desirable that the pressure required of the flushing liquid be no higher than the potable water pressure so that the same valving and pressure-regulating equipment can be used for both the potable water and the flushing water.

SUMMARY OF THE INVENTION

A toilet system is provided in which the toilet bowl can be satisfactorily flushed with a minimum amount of water at relatively low pressure. The toilet bowl is adapted to receive waste and a drain means for conveying waste from the toilet bowl to a waste-holding tank is provided. An evacuation means is coupled to the waste tank for creating at least a partial vacuum in the waste-holding tank. A flush switch is provided and upon actuation of the flush switch a flush valve in the drain means in the path of waste from the bowl to the waste-holding tank is opened for a predetermined time to permit the vacuum in the waste-holding tank to evacuate the waste from the toilet bowl. Water from the aircraft potable water system is introduced into the toilet bowl upon actuation of the flush switch to flush the toilet bowl and move the waste to the bowl exit. The water and waste is evacuated from the bowl and removed to the waste-holding tank.

The toilet bowl utilized in the toilet system of the invention has an upper portion and a lower portion, the lower portion of the bowl being in fluid communication with the drain means. The upper portion of the toilet bowl includes a conventional waste-receiving opening and a rim of substantially oval configuration is affixed to the upper portion of the bowl surrounding the waste-receiving opening. If desired, a seat suitably adapted to the shape of the rim can be mounted upon the rim in a conventional manner. A water manifold is affixed to the bowl immediately subjacent the rim and the water manifold is fluidly coupled to a water supply, preferably the potable water supply of the aircraft, to provide rinsing liquid to the toilet bowl. A plurality of nozzles is arranged on the manifold to direct streams of water from the manifold onto the sides of the toilet bowl to wash waste material and effluent from the sides of the bowl and to direct the waste material toward a toilet bowl exit formed in the lower aft portion of the bowl. The water and waste are removed from the bowl by the differential pressure caused by the evacuation of the waste-holding tank. The nozzles emanating from the manifold are constructed and arranged to cooperate with the sides of the bowl to move the water from the nozzles to the outlet drain opening of the toilet bowl on the shortest path while still covering substantially all of the interior surface of the bowl so that the maximum percentage of the water energy in washing waste from the sides of the bowl and moving the waste to the bowl exit opening. The nozzles are arranged so that each nozzle is assigned a particular area of the interior bowl surface to wash with water and the angle of impingement of the water stream from the nozzle upon the bowl is such that there is virtually no splash of the water and so that the streams, as they move from the point of impingement to the waste drain opening, coalesce to substantially cover the interior surface of the bowl.

Preferably, for purposes of utilizing the least amount of water in the flushing operation, while still providing sufficient water to clean the entire interior surface of the bowl and move all the solid waste matter to the toilet bowl exit opening, the nozzle and bowl are cooperatively configured so that the swirling action of the water, which is normally found in conventional household flush toilets, is eliminated. The elimination of the swirling action shortens the path that the water must travel from the nozzle to the toilet bowl exit, thereby permitting a smaller amount of water at lower pressure to completely wash the bowl while at the same time maintaining sufficient energy in the water to move solid waste to the bowl exit. In order to accomplish this, the sides of the bowl extending from the rim to the outlet drain opening are substantially straight and the normal bowl curvature found in ordinary home toilets is eliminated. The sides of the bowl generally converge from the rim to the bottom of the bowl to form a funneling effect moving the water and effluent to the drain opening.

BRIEF DESCRIPTION OF THE DRAWINGS

The present invention and its advantages will be better understood by those of ordinary skill in the art and others upon reading the ensuing specification when taken in conjunction with the attached drawings wherein.

DETAILED DESCRIPTION OF THE PREFERRED EMBODIMENT

Figure 1:
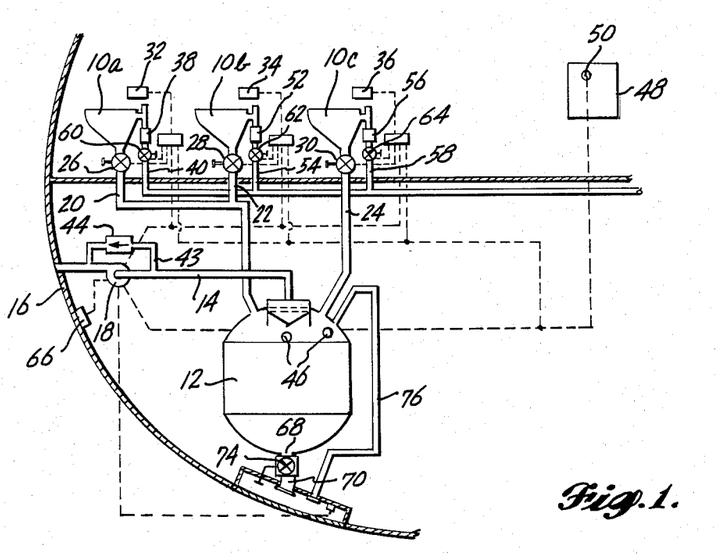
FIG. 1 is a schematic representation of a vacuum flush toilet system utilizing a freshwaster flush made in accordance with the principles of the present invention and adapted for use on a commercial passenger aircraft.

FIG. 1 is a schematic representation of a lavatory system designed in accordance with the principles of the present invention for use in a commercial passenger aircraft, such as the Boeing 767. As illustrated, the lavatory system includes three toilet bowls 10a, 10b and 10c which, although illustrated in proximity to one another, would actually be located in various portions of the aircraft to accommodate passengers sitting in the various seating sections. In actual practice aboard the Boeing 767 aircraft, for example, five toilet bowls are distributed in locations in the forward, midcabin, and aft-cabin sections of the aircraft. Depending upon the number of toilet bowls and the size of the aircraft, the toilet bowls will drain into one or more waste-holding tanks 12. In the illustrated embodiment, a single waste-holding tank 12 is shown with three toilet bowls draining into it. An evacuation line 14 is connected from an opening in the top of the waste-holding tank 12 to the exterior of the aircraft and is in communication with an opening in the aircraft exterior skin 16. At flight altitudes of approximately 15,000 feet and higher, the pressure external to the aircraft is low enough that the waste-holding tank 12 is evacuated through the evacuation line 14 by the low ambient air pressure external to the aircraft in comparison with the cabin pressure within the aircraft. For altitudes lower than 15,000 feet and while the aircraft is on the ground, evacuation is provided by a vacuum blower 18 located in line with the evacuation line 14. The toilet bowls 10a, 10b and 10c are connected to the waste-holding tank 12 by waste drain lines 20, 22, and 24 so that the suction caused by the pressure differential between the low pressure within the waste tank and the ambient cabin pressure will force waste deposited in the toilet bowls through the drain lines 20, 22, and 24, respectively, into the waste-holding tank. Flush valve 26 is installed in the drain line 20 adjacent its connection to the toilet bowl 10a to control the flushing action of the waste from the toilet bowl. If the flush valve 26 were not installed in the line 20, a constant flow of air would be drawn through the toilet bowl into the waste tank because of the pressure differential. Therefore, the flush valve 26 is normally in a closed position, preventing such airflow until such time as the toilet bowl is used for the depositing of waste and it is desired to empty the toilet bowl into the waste holding tank at which time the flush valve 26 is opened. Similar flush valves 28 and 30 are installed in the drain lines 22 and 24, respectively, to control the flushing of the remaining two toilet bowls 10b and 10c. The flush valve 26 can be any suitable valve and exemplary flush valves will be described in greater detail below. The flush valves 26, 28, and 30 are selectively operable through operation of a flush switch 32, 34, or 36, respectively associated with each of the toilet bowls 10a, 10b or 10c. Actuation of the flushing switch 32 also opens a water inlet valve 38 associated with the first toilet bowl 10a. The water inlet valve 38 is installed in series in a freshwater feed line 40, which leads from the potable water system of the aircraft to the toilet bowl 10a. Operation of the flush switch 32 opens the water inlet valve 38 to permit water to flow through the line 40 to remove waste material from the sides of the toilet bowl 10a and to move solid waste toward the drain of the toilet so that it can be evacuated from the toilet by the pressure differential. Preferably, the water inlet valve 38 is sequenced so that a predetermined time after it is opened by the actuation of the flushing switch 32 the water inlet valve 38 closes and fresh water no longer flows in to the toilet bowl from the potable water system. The flush valve 26 remains open for a predetermined time to allow the rinse water and waste to travel to the waste-holding tank. Upon expiration of the predetermined time the flush valve closes to close off the drain line 20 and prevent any further flow of air, water, or solid material from the toilet bowl 10a into the waste-holding tank 12.

As water and waste materials from the toilet bowl flow into the waste tank, air within the waste tank is evacuated through the evacuation line 14 to the exterior of the aircraft. A liquid separator 42 is installed in an opening in the top of the waste-holding tank 12 leading to the evacuation line 14. The liquid separator removes any entrained moisture from the air that passes through the evacuation line out of the waste-holding tank. The liquid separator is necessary so that no liquid or waste is passed to the exterior of the aircraft out of the waste-holding tank and also to prevent the flow of moisture through the blower 18, causing damage to the blower. A bypass conduit 43 is provided to conduct airflow around the blower 18. When the blower is not in use, the blower will present a restriction to air flow and the majority of the air from the waste tank will flow through the by-pass conduit 43. Preferably, a check-valve 44 is installed in the bypass conduit 43 to prevent the flow of air through the bypass conduit in the reverse direction when the blower is in use. A suitable liquid level sensor system 46 is associated with the waste-holding tank 12 to provide both an indication that the waste-holding tank is becoming filled with flushing water and waste and to shut off power to the lavatory system. The level sensor in the tank is connected to an attendant panel 48 containing a "waste tank full" warning light 50 and a system for deactivating the flush system associated with that tank. When the liquid level sensor senses that the waste level is reaching the limit of the tank's capacity, the indicator light 50 lights to indicate to the attendant, normally the flight engineer, that the tank must be emptied before any more waste material can be flushed into it. At the same time, power is removed from the flush switch so that the system can no longer flush into the full tank and vent liquid overboard.

A similar arrangement for feeding fresh water to the toilet bowl as described above for the toilet bowl 10a is also installed in connection with the toilet bowls 10b and 10c. Actuation of the flush switch 34 associated with toilet bowl 10b opens a water inlet valve 52 that permits the flow of water through the freshwater feed line 54 into the toilet bowl 10b and actuation of the flush switch 36 associated with the toilet bowl 10c opens a water inlet valve 56, which permits the flow of water through a freshwater feed line 58 into the toilet bowl 10c. The freshwater feed lines 40, 54, and 58 are all connected to the aircraft potable water system. Preferably, each of the freshwater feed lines, 40, 54, and 58 also has associated with it a manual shutoff valve 60, 62, and 64, respectively, so that the water entering the toilet bowl can be manually shut off if the water inlet valves fail in the open position.

The operation of the blower 18 is controlled by a barometric switch 66 which senses the barometric pressure outside the aircraft and switches off the blower when the barometric pressure is such that a sufficient pressure differential exists between the exterior ambient air pressure and the interior cabin pressure to operate the vacuum flush system without blower assistance. The barometric switch 66 will turn the blower back on when the aircraft is at such a low altitude that the external ambient pressure is too great to provide sufficient pressure differential to operate the vacuum flush system without blower assistance.

The waste tank 12 has a drain opening 68 located in the bottom thereof, which is connected through a waste drain line 70 to a service panel mounted on the exterior of the aircraft. A waste drain valve 74 is located in the drain line 70 to control flow of the waste through the drain line 70. A waste drain cap is located over the end of the waste drain line 70 to prevent escape of any liquid that might leak past double seal valve 74 from the waste-holding tank. When the aircraft is on the ground and ready for servicing, the waste drain cap is removed and waste drain valve 74 is opened allowing waste to drain from the waste tank through the drain line 70. Preferably, the waste drain valve is a double-sealed stainless steel ball valve having a seal on either side of the ball to prevent leakage through the valve thereby preventing buildup of flush liquid against the waste drain cap when it is in place on the drain line. Preferably, an interlock switch is located on the ground service panel door, so that when the panel door is opened to gain access to the waste drain line 70 and the tank is being serviced, power to the vacuum blower and flush switches is shut off to prevent operation of the lavatory system while the service panel door is open. Also, in the preferred embodiment, a tank rinse line 76 is connected from the service panel to the top of the waste tank to permit service personnel to inject water into the tank to rinse the interior surfaces of the tank walls.

Figure 2:
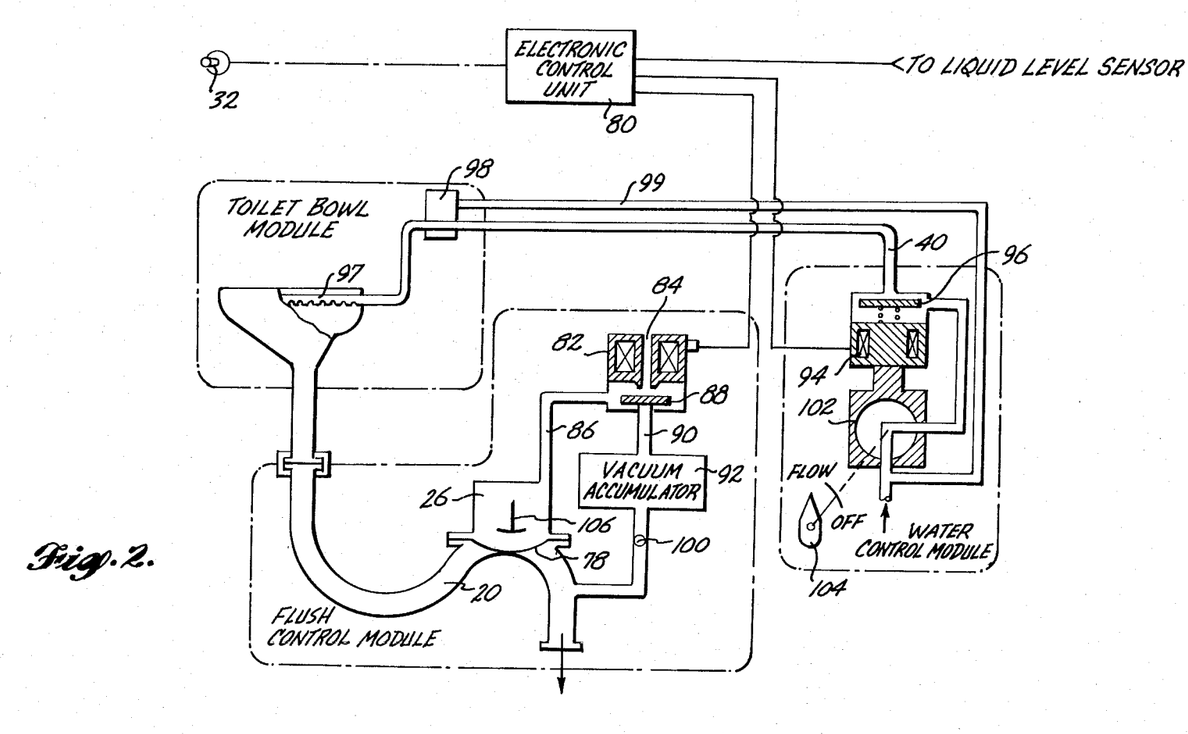
FIG. 2 is a schematic representation in somewhat more detail of a single toilet subsystem in the toilet system shown in FIG. 1.

Referring now to FIG. 2, the flushing and rinsing mechanism of the toilet system made in accordance with the present invention is shown in greater detail, although still in schematic form. The arrangement shown in FIG. 2 is a typical arrangement in accordance with the present invention and is, in fact, the arrangement used on the Boeing 767 aircraft. The flush valve 26 is located near a U-shaped bend in the waste drain line 20 and includes a flexible diaphragm 78. In its closed position, as illustrated in FIG. 2, the diaphragm 78 stretches across the bend in the waste drain line 20 closing off the waste drain line. When the flush switch 32 is activated, a signal is sent to an electronic control module 80, which in turn is coupled to the flush control valve solenoid 82. Prior to flushing, the flexible diaphragm 78 is maintained in its bowed state, blocking the drain line 20 by the air pressure within the airplane cabin, which is conducted through an opening 84 in the flush control solenoid 82 and through a control line 86 to pressurize the upper surface, as viewed in FIG. 2, of the flexible diaphragm 78. When the flush valve control solenoid 82 is energized by a signal by the electronic control module, indicating that the flush switch has been activated, the solenoid draws the valve member 88 to close the opening 84 through which cabin air pressure reaches the flexible diaphragm 78. The movement of the valve member 88 simultaneously opens a line 90 from a vacuum accumulator 92, which has a vacuum stored therein supplied by the vacuum in the waste-holding tank 12. The vacuum in the waste-holding tank has been formed either by the low pressure of the atmosphere external to the aircraft, or if the aircraft is below 15,000 feet, by the vacuum blower, which is activated by a signal from the electronic control module 80 upon actuation of the flush switch 32. The vacuum in the vacuum accumulator 92 causes a suction in the line 86, which in turn moves the flexible diaphragm 78 in an upward direction as viewed in FIG. 2, opening the waste drain line 20 and permitting waste to be propelled from the toilet bowl 10a through the waste line 20 into the holding tank. The electronic control module 80 also sends a control signal to a water inlet valve control solenoid 94. Upon energization of the water inlet valve control solenoid 94 by the electronic control module, a valve member 96 is drawn by the solenoid downwardly as viewed in FIG. 2, permitting fresh water to flow into the freshwater feed line 40. The freshwater feed line 40 is connected to a nozzle ring 97 through which the water is directed onto the toilet bowl interior walls to wash the waste matter from the toilet bowl and move it toward the bowl exit.

Health rules generally require that a vacuum breaker 98 be installed at the toilet bowl/freshwater interface to prevent siphoning of water from the toilet bowl into the freshwater line and possibly into the potable water supply. The waterbreak is pressurized by water in the vacuum breaker pressurization tube 99 bypassing the rinse valve.

Once the waste and flush water begin flowing through the drain line 20, the check-valve 100 in the vacuum line 90 between the drain line 20 and the vacuum accumulator 92 prevent any of the flush water or waste material from flowing into the vacuum accumulator. The electronic control module 80 contains a timer so that after the expiration of a predetermined amount of time from the activation of the flush switch 32, the electronic control module deenergizes the water inlet valve control solenoid 94. The valve member 96 is spring-loaded upwardly and upon deenergization of the solenoid 94 moves to block off the freshwater line 40 stopping the flow of fresh water into the toilet bowl 10. After the expiration of a second period of time, the electronic control module sends a signal to deenergize the flush valve control solenoid 82 causing the valve member 88 to move downwardly as viewed in FIG. 2 to block off the vaccum line 90 and open the ambient cabin air passage 84 to permit the pressure within the cabin to force the flexible diaphragm 78 back to the position shown in FIG. 2, thereby closing off the drain line 20. When this occurs, the vacuum from the holding tank again tends to be accumulated in the vacuum accumulator 92 in preparation for the next flush cycle.

Preferably, the freshwater line has a manual shutoff valve 102 associated with it, which is manually activated by a handle 104 so that, in the event of power failure or valve failure in the open position, the fresh water can be manually shut off to prevent overflowing of the toilet bowl or excessive use of the potable water, which is in limited supply on the typical commercial aircraft. Preferably, the flush valve 26 also includes a manual follower 106 attached to the diaphragm and enabled to be moved manually from without the valve to operate the flush valve in the event of a failure of the valve controls. If a valve failure occurs in the open position the manual follower 106 is provided to enable the flush valve to be closed by hand so that there is not a constant stream of air flowing from the cabin through the toilet bowl into the waste tank.

Figure 3:
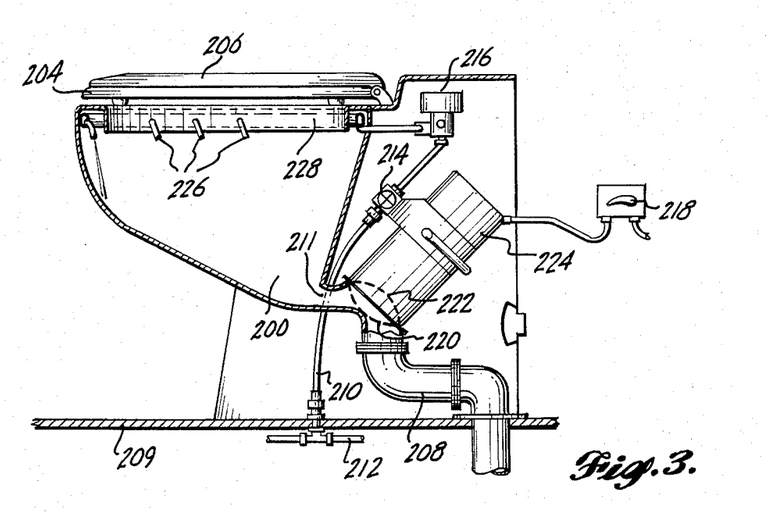
FIG. 3 is a somewhat schematic representation of a toilet bowl and associated hardware for use in a vacuum flush toilet system made in accordance with the principles of the present invention.

Referring now to FIG. 3, a toilet fixture made in accordance with the principles of the present invention is shown in partial section. A typical toilet seat 204 is shown resting on the upper rim of a bowl 200. A constant airspace is maintained along the upper rim of the toilet bowl 200 between the bowl rim and the toilet seat 204 to prevent a sealing contact between the person sitting upon the toilet and the toilet bowl itself. If such a sealing arrangement were possible, actuation of the flush switch while seated on the toilet could cause personal injury to the user. A cover 206 is shown in the closed position, resting upon the toilet seat 204. The toilet bowl 200 includes an exit opening 211 that is connected to a waste drain line 208, which leads through the floor 209 to the waste-holding tank. It should be noted that typically in the vacuum flush system the waste drain lines are two inches in diameter. It should be noted that the exit opening 211 from the toilet bowl leading to the waste drain line is constricted somewhat with respect to the waste drain line. The constriction ensures that any material that can pass out of the toilet bowl through the constricted opening 211 into the waste drain line 208 will then pass without problem through the waste drain line all the way to the waste-holding tank. If the waste drain line is two inches, then the exit from the toilet bowl is typically $1\frac{1}{2}$ to $1\frac{3}{4}$ inches in size.

Fresh water is fed to the toilet bowl through a freshwater line 210, which in turn is connected to the feed lines 212 from the potable water supply. The water inlet valve 214 is connected in the freshwater line 210 to control the flow of water to the toilet bowl. A conventional vacuum breaker 216 is installed in the freshwater line at the interface with the toilet bowl to prevent siphoning of water from the bowl back through the freshwater line to the potable water supply.

A flush valve 224 is installed in the waste drain line to control the movement of waste from the toilet bowl into the waste drain line 208. The illustrated valve is a pinch-type valve with a flexible diaphragm. The diaphragm is shown in its closed position by dotted line 220 and its open position by the dotted line 222. The valve pictured is an electrically controlled valve operated by a motor which in turn is operated by the flush timer and flushing switch 218. In certain respects, the electrically actuated flush valve is more desirable than the vacuum operated flush valve shown in FIG. 2. The electrically operated flush valve is not affected by the vacuum in the system and therefore is not affected by simultaneous flushing of more than one toilet or leakage in the vacuum control system for the flush valve and operates in a predictable manner upon each flush with high reliability. Preferably, the flush valve 224 and the water inlet valve 214 are operated in timed sequence upon actuation of the flush switch 218 to provide water to the bowl and to flush the toilet bowl. In a preferred embodiment of the invention, at least a portion of the interior surface of the toilet bowl, i.e., the portion upon which solid debris is primarily deposited at the bottom on the bowl, is coated with a nonstick material such as polytetrafluoroethylene sold under the trademark "Teflon" by the DuPont Chemical Company or some other like material, such as that sold under the trademark "Silverstone" by the DuPont Chemical Company.

The key to utilizing a vacuum flush freshwater rinse toilet system in a commercial passenger aircraft is in minimizing the amount of water needed to wash the toilet bowl during each flushing operation so that the aircraft is able to carry a sufficient amount of water to handle the needs of the passengers in a typical maximum flight. We have found that if the amount of water utilized in each flushing operation is kept to approximately eight ounces in volume, the aircraft, such as the Boeing 767, can carry sufficient water to operate the toilet systems throughout a typical maximum flight without unduly taxing the potable water supply. In order to properly flush the toilet bowl with only eight ounces of water, it is necessary to introduce the water into the bowl in a plurality of directed streams, rather than simply allowing the water to flow through apertures found in the typical home toilet. The directed streams of flush water are produced by a series of nozzles 226 mounted on a manifold 228 located around the rim of the toilet bowl and coupled in fluid communication to the freshwater inlet line 210. It is necessary to match the position and size of the nozzles to the particular toilet bowl shape that is being used, so that each nozzle produces a round stream that is dedicated to a particular area of the toilet bowl with sufficient coalescence of adjacent streams so that all interior surfaces of the bowl are rinsed, but yet without excessive overlap so that no water is wasted in washing the same area twice. Further, since waste removal from the bowl is accomplished through differential pressure between the waste-holding tank and the cabin, it is not necessary that the water perform the function of forcing the waste through the drain line. The water must simply move the waste into proximity with the bowl exit so that the pressure differential can act on the waste to move it from the bowl through the drain line.

Figure 4A:
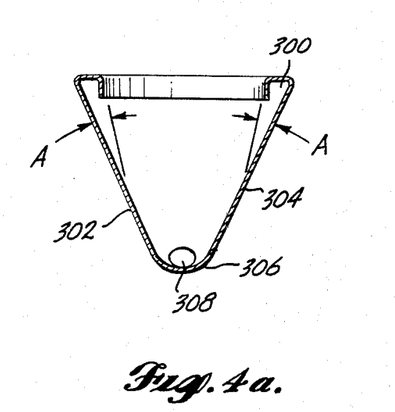
FIGS. 4a, 4b and 4c are a series of orthographic projections showing a toilet bowl configuration made in accordance with the principles of the present invention suitable for use in a toilet system as shown in FIG. 1.
Figure 4B:
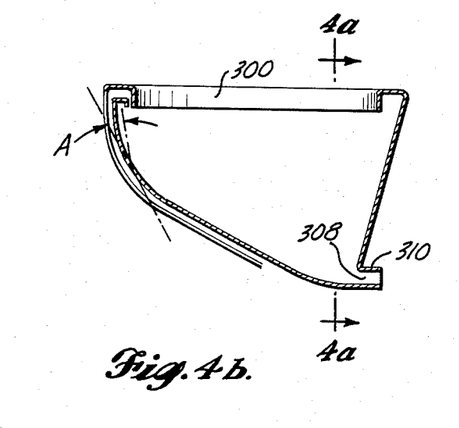
Figure 4C:
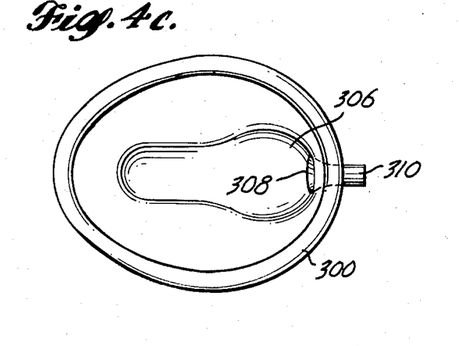

FIGS. 4a, 4b and 4c show, in a series of orthographic projections, the front, side and plan views of a toilet bowl made in accordance with the present invention to provide a satisfactory flush with a maximum of eight ounces of fresh water. The bowl has a substantially oval rim 300, very similar to conventional toilets found in most households. The size and shape of the upper rim is determined to some extent by human factors, the width being dictated by the requirement to conform to "standard" toilet seat shapes. The size and shape of the bowl from front to back are also dictated by human requirements and the shape of the front of the bowl is dictated by the human male anatomy. The bowl should be deep enough at the front portion so that the male sitting on the bowl does not come in contact with the interior of the toilet bowl. Typical dimensions for the bowl shown in FIGS. 4a, 4b and 4c are a dimension of fifteen inches from front to back and a width of $9\frac{3}{4}$ inches. It should be noted that the sides 302 and 304 of the bowl are substantially straight sloped from the outer portion of the upper rim 300 downwardly and inwardly to the bottom portion 306 of the bowl. The forward portion of the bowl extends substantially vertically from the rim to provide clearance for the human male anatomy, as is the case with most convenient toilet bowls. The straight sloping sides 302 and 304 of the bowl of FIG. 4b are configured so as to provide the shortest path for fluid used to flush the bowl to travel from the rim 300 to the bowl exit 308. Further, the straight sides of the bowl prevent any inadvertent swirling action of the water prior to its exiting the bowl. Most conventional toilets are designed to promote a swirling effect of a large quantity of the flush water as it travels along the sides of the bowl in order to completely cover the sides of the bowl and remove all waste particles. The swirling of the water increases the length of the path that the water travels prior to contacting the solid debris and exiting the bowl. The longer the path the water travels for the exit, the more water energy is utilized in transporting the water to the bowl exit rather than in directing all of the energy of the water to washing the sides and bottom of the bowl to remove waste therefrom. The bowl of FIGS. 4a, 4b and 4c, with its straight sloping sides, provides substantially a straight-line path for the water from the rim 300 to the exit 308 with no swirling. The shortened path ensures that substantially all the water energy is utilized in removing waste material from the interior surfaces of the bowl.

The rounded bottom 306 of the bowl of FIG. 4a provides an area where the water collects and tends to cause flotation of the solid waste matter deposited at the bottom of the bowl to float the waste toward the exit opening 308 where the pressure differential draws the waste out of the bowl into the waste drain line.

In the preferred embodiments of the toilet bowl shown in FIGS. 4a, 4b and 4c, the exit from the toilet bowl opens to the rear of the bowl adjacent the bottom wall. A tailpiece 310 extends from the exit opening for connection to the suitable piping arrangement to conduct waste material from the exit of the bowl to the waste-holding tank. The exit opening is preferably of circular cross section and in the preferred embodiment is approximately $1\frac{1}{2}$ to $1\frac{3}{4}$ inches in diameter, which is slightly smaller than the two-inch diameter drain lines used to move the waste to the waste-holding tank.

The toilet bowl of FIGS. 4a, 4b and 4c, from the standpoint of most efficient use of water energy is the optimum design, since it minimizes the interior surface area of the toilet bowl. However, certain accommodations can be made for the passenger's comfort and therefore, a slightly wider, deeper bowl has been installed in the configuration actually used on the Boeing 767. The same principle of water introduction still applies, however, and the water must be introduced through a manifold and director nozzle arrangement that is matched to the particular bowl configuration to achieve the objective of complete flushing of the bowl with a minimum amount of water, in this case, eight ounces.

Figures 5, 7:
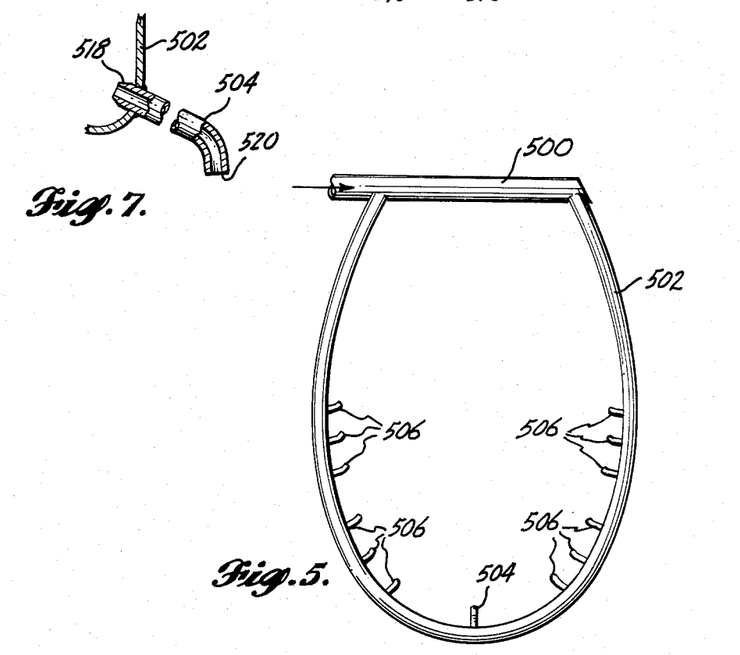
FIG. 5 is a plan view of a water manifold made in accordance with the principles of the present invention suitable for use with the toilet bowl configuration shown in FIG. 4.
FIG. 7 is a detailed view of a portion of the manifold shown in FIG. 8 showing a nozzle tip configuration interior to the manifold.

FIG. 5 shows in plan view a manifold and spray nozzle arrangement designed for use with the bowl configuration shown in FIG. 4. A straight-line freshwater inlet pipe 500 is connected at a first end to the freshwater line and is in fluid communication with an ovalized manifold 502, which is positioned around the upper rim of the toilet bowl. A series of director nozzles extends from the manifold in fluid communication therewith to introduce water into the toilet bowl. As viewed in FIG. 5, the lowermost pictured portion of the manifold is located at the front of the toilet bowl and has a nozzle 504, which is oriented with respect to the bowl so that it directs water in a straight-line path to the bowl exit opening at the rear of the bowl. The remaining nozzles 506 are oriented so that the water introduced into the toilet bowl follows generally a straight-line path along the toilet bowl sides to the bowl exit, washing the toilet bowl sides and carrying waste material toward the bowl exit. In FIG. 4, the angles designated A are representative of the angle of impingement of the water from the nozzles 504 and 506 on the front and sides of the interior of the toilet bowl. The angle of impingement A is very important in producing the desired effect.

Figure 6:
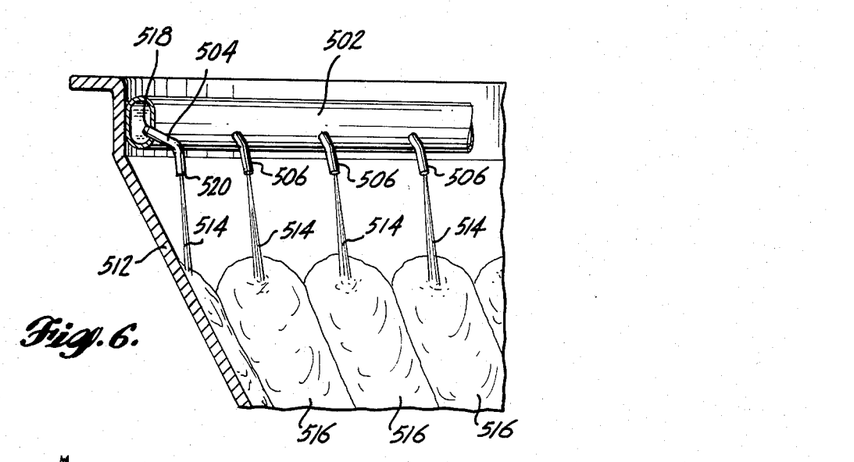
FIG. 6 is a detailed view of a portion of the manifold shown in FIG. 5.

FIG. 6 illustrates in greater detail a portion of the manifold 502 and nozzles 504 and 506 in relation to the interior of a toilet bowl. The angle A of impingement of the water streams 514 with the sides of the toilet bowl should be not so great as to cause splash of the water, which reduces the energy of the water available to move waste. Water splash also is physically uncomfortable to the user. By the same token, the angle of impingement A must not be so small as to cause the streams 514 to strike the toilet interior wall 512 too low to be effective in cleaning, for example, urine, which has splashed to the upper portions of the wall. Each of the nozzles 504 and 506 is oriented so that its stream is dedicated to a particular portion of the interior surface 512 of the toilet bowl and washes that portion. It is also necessary that the water, after it strikes the interior surface of the toilet bowl, fan out and coalesce, as indicated by stream 516, with the water from adjacent nozzles so that substantially the entire surface of the toilet bowl is washed. The fanning effect of the water from the nozzles should not be so great, however, that there is a large amount of overlap from one stream of water to the next so that the same portion of the bowl is not washed by an excess amount of water, thereby keeping water usage at a minimum. Again, the particular arrangement shown in FIGS. 5 and 6 is exemplary only and the exact configuration of any manifold and director nozzle arrangement must be matched to the particular toilet bowl shape in order to achieve the desired effect. However, in all situations the water should enter the toilet bowl at an angle A such as to prevent splashback of the water and to permit the water to coalesce together to cover all portions of the bowl to effectively flush the bowl clean. Also, the direction of the water introduced into the bowl should be such as to utilize the maximum amount of energy of the water stream to move the waste material toward the bowl exit opening so that it can be acted upon by the differential pressure to move it out of the toilet bowl to the waste-holding tank.

FIG. 8 shows in detail of a typical director nozzle 504 in the manifold. Note that the tip 518 of the nozzle is convergent as opposed to having a V-shape so that dirt particles, rust or flakes, within the rinse water system will not become lodged within the director nozzle. Also, the exit end 520 of the nozzle is squared off so that the stream exiting is round and coherent without spraying. Since each director nozzle is dedicated to a particular area of the toilet bowl, clogging of a nozzle will prevent complete rinsing of the bowl, since the area covered by that nozzle will not be properly washed. Since the position and orientation of the director nozzles are critical to the proper rinsing of the bowl with the predetermined amount of water, it is necessary to construct the manifold and nozzles with enough strength to withstand cleaning without disrupting the positioning of the nozzles. Typically, a brush will be used to brush down the sides and rim of the bowl during the nightly cleaning of the lavatories on the aircraft and the nozzles should be sturdily constructed so that the brushing does not disrupt their position and orientation. The size of the manifold piping should also be sufficient so as to minimize the pressure loss of water from the entry to the manifold to its exit from the director nozzles.

The manifold pictured in FIG. 6 is particularly designed for use in an aircraft, since the nozzles protrude from the bottom of the manifold. In an aircraft, it is necessary that the manifold drain between flushes so that when the aircraft is not in use and stored in freezing environments there is no water left within the manifold, which can freeze and cause physical damage to the piping. If the toilet system were to be installed in an environment that was never subjected to freezing temperatures, it would be desirable to have the nozzles protrude from the manifold's upper portion so that the manifold did not drain between flushes and would be full of water awaiting the next flush to provide instantaneous entry of water into the bowl upon actuation of the flushing switch.

One feature that must be considered in constructing the toilet system of the present invention is that the exit from the toilet bowl should be of a size such that the velocity of air going through the exit is not so great as to cause noise problems. In fact, in developing the system for the Boeing 767, the exit opening was originally designed to be 1½ inches in diameter. When it was found that this opening was too noisy, the opening size was increased to 1¾ inches to reduce the velocity of air flowing through the opening and thereby reduce the noise factor.

When the aircraft is at an altitude above 15,000 feet, the pressure differential between the exterior of the aircraft and the cabin is sufficient to properly flush the toilet bowl upon actuation of the flush switch. When the plane is at an altitude below 15,000 or on the ground, a suitable sequence upon actuation of the flush switch is to turn the blower 18 on for a few seconds and then to energize the flush valve control solenoid to open the flush valve for approximately four seconds. The water inlet valve is opened for approximately one second permitting a flow of eight ounces of water into the bowl to rinse the bowl. The exact time period during which the flush valve remains open is a function of the length of the drain lines from the toilet bowl to the waste-holding tank. Preferably, the flush valve should remain open for a long enough time to permit removal of substantially all the waste matter and water from the bowl and the drain line to prevent the possibility of freezing of any material left in the drain lines. Also, a typical delay of fifteen seconds is designed into the electronic control module between successive flushes to discourage repeated flushes by the curious and also to statistically lessen the probability of simultaneous flushing of two or more toilets in multiple toilet systems.

In summary, a lavatory system utilizing a vacuum and freshwater flush suitable for use on a commercial passenger aircraft is provided. The lavatory system includes a toilet bowl into which water is introduced by a water ring, the toilet bowl and ring being matched so that complete rinsing of the bowl utilizing approximately eight ounces of water can be accomplished. A waste-holding tank is included for receiving waste from the toilet bowl and is fluidly coupled to the exit drain of the toilet bowl. A means is provided for at least partially evacuating the waste-holding tank so as to create a pressure differential between the interior of the tank and the interior of the cabin so as to force the waste from the toilet bowl into the waste-holding tank by means of the pressure differential. A flush valve is provided at the exit of the bowl within the drain line connecting the bowl to the waste-holding tank. The flush valve is selectively operable to control draining of the toilet bowl into the waste tank. The water line from the potable water supply is connected to the toilet bowl to provide fresh water to assist in flushing the toilet bowl and a water inlet valve is placed in the water line to selectively control the introduction of fresh water into the toilet bowl. The flushing of the toilet bowl into the waste-holding tank and the introduction of water into the toilet bowl are controlled in a timed sequence upon an actuation of the flushing switch. The toilet bowl configuration of the present invention is constructed to provide optimum utilization of flushing water to adequately wash the interior surfaces of the bowl with a minimum of water under a minimum pressure. The novel flushing manifold has a plurality of water-directing nozzles affixed thereto in fluid communication therewith and the toilet bowl and manifold are matched to provide a toilet suitable for use on commercial aircraft or other commercial vehicles with a limited supply of fresh water available. While particular embodiments of the invention have been described and illustrated herein, it will be apparent to those of ordinary skill in the art and others that certain modifications can be made to the lavatory system and the toilet bowl and manifold configuration while remaining within the scope of the present invention. For example, although particular values for the certain dimensions of the toilet bowl have been disclosed, those dimensions are exemplary only and bowls having the same general configuration with varying dimensions can be constructed within the principles of the present invention. Also, depending on the particular toilet bowl configuration utilized, the exact details of the manifold and director nozzle arrangement will be varied to match the toilet bowl configuration to achieve the proper result. Further, although a pinch-type valve has been disclosed as the preferable type of valve for the flush valve, it is possible to use other types of valves and still construct an operable toilet system. As has been discussed, the flush valve can be vacuum-actuated or electrically actuated. The altitudes disclosed herein, above and below which the vacuum blower is operative, are exemplary only and variations in the altitude at which the blower is activated and deactivated can vary somewhat in the actual configuration of a system. Since variations in the illustrated embodiments can be made while remaining within the scope of the present invention, the present invention should be defined solely by reference to the claims appended hereto.

The embodiments of the invention in which an exclusive property or privilege is claimed are defined as follows:

1. A vacuum flush toilet system utilizing fresh water to assist in flushing for use in aircraft, said toilet system comprising:
   a toilet bowl for receiving waste;
   a waste-holding tank;
   drain means coupled in fluid communication between said toilet bowl and said waste-holding tank for conveying waste from said toilet bowl to said waste-holding tank;
   flush valve means associated with said drain means selectively operable to permit the passage of waste through said drain means;
   evacuation means coupled to said waste-holding tank for creating at least a partial vacuum in said waste-holding tank;
   water introduction means connected to said toilet bowl and to a source of fresh water for supplying fresh water to said toilet bowl; and
   a water inlet valve means connected to said water introduction means and selectively operable to stop the flow of fresh water to said toilet bowl.

2. The vacuum flush toilet system of claim 1 further including:
   nozzle ring means mounted on said toilet bowl and in fluid communication with said water introduction means;
   a plurality of nozzles protruding from said nozzle ring means and operable to direct water from said water introduction means onto the inside walls of said toilet bowl.

3. The toilet system of claim 2 further including:
   a timer means coupled to and associated with said flush valve means and said water introduction means to control the operation of said water introduction means and said flush valve means in a predetermined sequence; and
   a flushing switch manually operable and coupled to said timer means for actuating said timer means, said timer means including a delay means for preventing operation of said flush valve means and water introduction means for a predetermined time period after the previous operation of the flush valve means and water introduction means.

4. The toilet system of claim 3 wherein said flush valve and said water introduction means are both manually actuatable in addition to being controlled by said flushing switch and timer.

5. The toilet system of claim 3 wherein said timer means is adapted to operate said water introduction means to permit a predetermined quantity of water into said toilet bowl.

6. The toilet system of claim 5 wherein said predetermined amount of water is less than ten ounces.

7. The toilet system of claim 5 wherein the predetermined amount of water is in the range of six to ten ounces.

8. The toilet system of claim 1 wherein said toilet bowl includes an upper portion and a lower portion, said bowl having an exit opening formed in the lower portion thereof, said exit opening being in fluid communication with said drain means and wherein further said water introduction means includes a manifold mounted on the upper portion of said bowl in fluid communication with said supply of fresh water and a plurality of nozzle means arranged on said manifold and in fluid communication therewith to provide water to wash waste from said toilet bowl toward said exit opening, said nozzle means being constructed and arranged to direct streams of water from said nozzles along the interior surfaces of said bowl, said nozzles being arranged such that the impingement of said water on said interior surfaces of said bowl occurs without splash of said water toward the upper portion of said bowl and further arranged so that each nozzle is oriented and constructed to produce a water stream that is dedicated to cover a particular area of said interior surface of said toilet bowl and so that adjacent ones of said streams coalesce to form a substantially continuous sheet of water over substantially the entire interior surface of said bowl.

9. A toilet construction comprising:
   a bowl having a substantially oval upper rim surrounding the waste-receiving opening of the bowl, the sides of the bowl being substantially planar and converging as they extend downwardly from said rim;
   a waste outlet formed in the bottom of said bowl, said outlet opening rearwardly;
   a manifold mounted inside said rim for providing water to said toilet; and
   a plurality of nozzles mounted on and in fluid communication with said manifold, said nozzles providing streams of water to wash waste from said bowl through said waste outlet, said nozzles being arranged so that said streams of water are directed downwardly and rearwardly from said manifold toward said outlet along the shortest straight-line path and further arranged so that said streams impinge said sides of said bowl at an angle such that no splashback of water occurs in a direction toward said waste-receiving opening.

10. The toilet construction of claim 9 wherein said nozzles are further arranged such that adjacent streams of water coalesce to form a substantially uniform sheet of water along the sides of said toilet bowl.

11. The toilet construction of claim 10 further including:
    a waste-holding tank in fluid communication with said waste outlet;
    means for maintaining reduced pressure within said waste-holding tank relative to the pressure surrounding said toilet bowl such that said waste material is evacuated from said toilet bowl through said outer opening by means of the pressure differential between the ambient pressure surrounding said bowl and the pressure within said waste-holding tank.

12. The toilet construction of claim 10 further including:

a means for regulating the amount of water entering said bowl for each flush.

13. The toilet construction of claim 11 wherein said predetermined amount of water is less than ten ounces.

14. The toilet construction of claim 11 wherein said predetermined amount of water is in the range of six to ten ounces.

* * * * *

UNITED STATES PATENT AND TRADEMARK OFFICE
CERTIFICATE OF CORRECTION

PATENT NO. : 4,521,925
DATED : June 11, 1985
INVENTOR(S) : Chen et al.

It is certified that error appears in the above-identified patent and that said Letters Patent is hereby corrected as shown below:

Column 2, line 48, "energy in" should be --energy is utilized in--.

Column 3, line 19, "freshwaster" should be --freshwater--.

line 40, "8" should be --6--.

Column 11, line 10, "8" should be --7--.

Column 14, line 63, "outer" should be --outlet--.

Signed and Sealed this

Twenty-first Day of January 1986

[SEAL]

Attest:

DONALD J. QUIGG

*Attesting Officer*  *Commissioner of Patents and Trademarks*